United States Patent [19]

Simonsen

[11] Patent Number: 5,358,334
[45] Date of Patent: Oct. 25, 1994

[54] RECLOSABLE PROFILE STRIP WITH JOINING WEB

[75] Inventor: Steven H. Simonsen, Neenah, Wis.

[73] Assignee: Reynolds Consumer Products Inc., Appleton, Wis.

[21] Appl. No.: 166,676

[22] Filed: Dec. 14, 1993

Related U.S. Application Data

[63] Continuation of Ser. No. 16,364, Feb. 11, 1993, abandoned.

[51] Int. Cl.$^5$ ............................................. B65D 33/34
[52] U.S. Cl. .................................... 383/63; 383/61; 383/211
[58] Field of Search ................... 383/61, 63, 211, 210

[56]  References Cited

U.S. PATENT DOCUMENTS

| | | | |
|---|---|---|---|
| 3,945,403 | 3/1976 | Noguchi | 383/63 X |
| 4,701,358 | 10/1987 | Behr et al. | 383/63 X |
| 4,896,775 | 1/1990 | Boeckmann et al. | 383/63 X |
| 4,925,316 | 5/1990 | Van Erden et al. | 383/63 X |
| 4,966,470 | 10/1990 | Thompson et al. | 383/61 |
| 4,969,309 | 11/1990 | Schwarz et al. | |
| 5,010,627 | 4/1991 | Herrington et al. | |
| 5,024,537 | 6/1991 | Tilman | 383/61 X |
| 5,042,224 | 8/1991 | McMahon | |
| 5,063,069 | 11/1991 | Van Erden et al. | 383/63 X |
| 5,067,822 | 11/1991 | Wirth et al. | |
| 5,092,684 | 3/1992 | Weeks | 383/61 |
| 5,096,516 | 3/1992 | McDonald et al. | 383/61 X |
| 5,238,306 | 8/1993 | Heintz et al. | 383/210 X |

*Primary Examiner*—Allan N. Shoap
*Assistant Examiner*—Jes F. Pascua
*Attorney, Agent, or Firm*—Alan T. McDonald

[57]  ABSTRACT

A recloseable profile strip designed to eliminate the slipping of the top web with respect to the bottom web in the recloseable profile strip of a recloseable package and remove the need for a tack seal. The present invention utilizes a joining web to join the top web and bottom web of the recloseable profile strip of a recloseable package. The recloseable profile strip is extruded through a die from molten material in a flat, single strip. In the double recloseable profile strip of the present invention, the first and second top webs each having an interlocking member flank the bottom web having two interlocking members. A thin, first joining web joins the margin of the first top web to a first margin of the bottom web, and a thin, second joining web joins the margin of the second top web to the second margin of the bottom web. The single strip is then cooled. A machine positions the top webs above the bottom webs, and a "mater" interlocks the interlocking members of the top webs with the interlocking members of the bottom web. The strips of double recloseable profile strip can then be used with conventional form-fill-seal machinery to make the recloseable packages.

11 Claims, 2 Drawing Sheets

RECLOSABLE PROFILE STRIP WITH JOINING WEB

This application is a continuation of application Ser. No. 08/016364 filed Feb. 11, 1993, now abandoned.

FIELD OF THE INVENTION

The present invention generally relates to reclosable profile strips and the reclosable packages made from them. More particularly, this invention relates to the reclosable profile strips used to make reclosable packages using the horizontal form-fill-seal method a method of making these reclosable profile strips into one piece strips.

BACKGROUND OF THE INVENTION

Reclosable packages are widely used in the packaging of a variety of products, especially food. Reclosable packages are very convenient because, after initially opening a reclosable package, consumers can reclose the package and better preserve the contents of the package. A top film and a bottom film enclose the contents of the package by heat sealing the top film and the bottom film together along the sides of the films. A side of the top film and the bottom film remain unsealed. A reclosable profile strip is sealed along the unsealed side of the top film and the bottom film, forming a reclosable package.

The reclosable profile strip on the reclosable package has a top web and a bottom web. The reclosable profile strip forms a reclosable package by sealing the bottom web to the bottom film and by sealing the top web to the top film. The top web and the bottom web each has an interlocking member. The interlocking member of the top web interlocks with the interlocking member of the bottom web, usually as a mated pair of a male profile and a female profile. In this way, the consumer can reclose the package by interlocking the interlocking members of the top web and the bottom web.

A common method of producing reclosable packages is by the horizontal form-fill-seal method. Vacuum packaging machines such as the TIROMAT machinery incorporate the horizontal form-fill-seal method. A horizontal form-fill-seal machine requires an already-made continuous roll of reclosable profile strip. The reclosable profile strips presently used with the horizontal form-fill-seal machinery are formed from a molten material. The reclosable profile strip is extruded through a die from the molten material into three separate sections. Two top webs each having an interlocking member are extruded alongside and at opposite ends of a bottom web having two interlocking members. The two top webs and the bottom web are then cooled. After cooling, the two top webs are positioned above the bottom web, and a "mater" interlocks the interlocking members of the top webs with the interlocking members of the bottom web. The continuous reclosable profile strip forms a roll of double reclosable profile strip because the two pairs of interlocking members will form the reclosable profile strips of two reclosable packages.

A horizontal form-fill-seal machine receives a continuous, double reclosable profile strip from a roll along with a continuous sheet of bottom film from another roll. The reclosable profile strip is positioned above the bottom film. In the first stage of the method as described in U.S. Pat. No. 4,969,309 and incorporated here by reference, the machine forms loops in the bottom web perpendicular to the profile strip. Heating bars bond the bottom web of the recloseable profile strip to the bottom film, and a pair of heating rods also bond or "tack" seal the top webs of the profile strip to the bottom web. The machine cuts the continuous, double recloseable profile strip into sections of double recloseable profile strip such that each section of recloseable profile strip corresponds to a pair of recloseable packages. The "tack" seals prevent the top webs of each section of recloseable profile strip from slipping with respect to the bottom web, resulting in a detective recloseable package. The machine then straightens the bottom film, leaving gaps between the sections of recloseable profile strip.

After the first stage, the horizontal form-fill-seal machine has sections of double recloseable profile strip bonded to the bottom film. In the remaining stages, the machine first preheats the bottom film and forms a cavity in the shape of the eventual contents of the package. The machine then fills the cavity with the product. The filled cavity is covered by a top film and heat sealed to the bottom film and the recloseable profile strip, forming a filled recloseable package. At this time, heating bars may activate bonding material located on opposing portions of the top webs and the bottom web to form peel seals between the top webs and the bottom web that remain sealed until the package is initially opened. Finally, the machine forms individual packages by cutting the bottom film and the bottom web of the double recloseable profile strip along the length of the bottom web and by cutting the top film and the bottom film of the package outside of the heat seal that joins them.

The tack seals of the first stage are necessary to prevent the slipping of the top webs from the bottom web, resulting in a defective recloseable package. The tack seals, however, create other problems with the recloseable packages formed by horizontal form-fill-seal machinery. The tack seals can melt the interlocking members of the top webs and the bottom web together and, thus, hinder the opening of the recloseable package. Similarly, if the bonding material for peel seals is present, the tack seals may inadvertantly activate the bonding material, and when the machine intentionally activates the bonding material, the doubly activated bonding material forms highly aggressive peel seals. These highly aggressive peel seals also hinder the opening of the recloseable package. The application of a tack seal requires heating rods to crush the top webs and the bottom web together. Sometimes, these heating rods puncture the bottom film, the top film or the bottom film. A puncture leads to a defective package and a spoiled or contaminated product.

SUMMARY OF THE INVENTION

A primary object of the present invention is to provide a recloseable profile strip designed to eliminate the slipping of the top web with respect to the bottom web in the recloseable profile strip of a recloseable package and, consequently, remove the need for the tack seal in the making of recloseable packages. With the removal of the tack seal, the aforementioned drawbacks of the tack seal are also eliminated.

A further object of this invention is to provide an additional seal between the top and bottom webs of a recloseable profile strip. This additional sea/between the top and bottom web of the recloseable profile strip can provide an additional safeguard against the leaking of the recloseable package and as a tamper guard to signal that the recloseable package has been opened.

Accordingly, the present invention relates to a recloseable profile strip, a recloseable package using the recloseable profile strip and a method for making the recloseable profile strip of the present invention. The present invention accomplishes the above objects by utilizing a joining web to join the top web and bottom web of the recloseable profile strip of a recloseable package.

In a preferred embodiment of the present invention, a double recloseable profile strip has a bottom web having two interlocking members and a first and second top web each having an interlocking member that interlocks with an interlocking member of the bottom web. The interlocking members of the top webs and the interlocking members of the bottom web interlock to form two pairs of a male profile mated with a female profile. Each pair will correspond to a recloseable profile strip of a recloseable package. A first joining web joins a margin of the first top web to a first margin of the bottom web, and a second joining web joins a margin of the second top web to the second margin of the bottom web. In this way, the top webs can not slip with respect to the bottom web and create badly aligned recloseable profile strips and defective packages. With the problem of web slippage removed, the tack seal of the horizontal form-fill-seal method and its associated drawbacks are removed.

The recloseable profile strip of the preferred embodiment mentioned above is extruded through a die from molten material in a flat, single strip. The first and second top web each having an interlocking member flank the bottom web having two interlocking members. A thin, first joining web joins the margin of the first top web to a first margin of the bottom web, and a thin, second joining web joins the margin of the second top web to the second margin of the bottom web. The single strip is then cooled. A machine positions the top webs above the bottom webs, and a "mater" interlocks the interlocking members of the top webs with the interlocking members of the bottom web. The strips of double recloseable profile strip of the present invention can then be used with conventional form-fill-seal machinery to make the recloseable packages.

The double recloseable profile strip of the present invention is fed into the conventional form-fill-seal machinery in the same manner as the profile strip of the prior art. The tack seal step, however, is omitted due to the joining webs. After the horizontal form-fill-seal machinery forms the individual packages, a thin joining web remains that joins the top web and the bottom web of the recloseable profile strip of the individual recloseable package. A consumer rips through this thin joining web by spreading open the top web and the bottom web of the packages's profile strip. This thin joining web not only eliminates the need for the tack seel but also provides an additional seal to protect the contents of the package and acts as a warning that the package has been tampered with.

BRIEF DESCRIPTION OF THE DRAWINGS

The advantages of the present invention will become apparent upon reading the following detailed description and upon reference to the accompanying drawings, in which.

DETAILED DESCRIPTION OF THE PREFERRED EMBODIMENT

Figure 1:
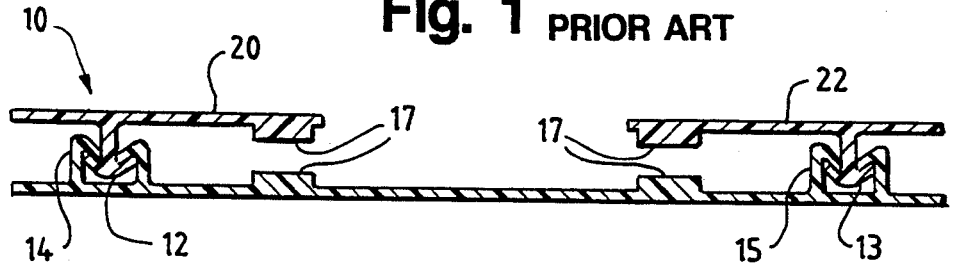
FIG. 1 is a cross-sectional representation of a double recloseable profile strip of the prior art.

Referring now to the drawings, and more particularly to FIG. 1, there is illustrated a double recloseable profile strip of the prior art, generally designated by the reference numeral 10, for use in a conventional form-fill-seal machine in the making of recloseable packages. The profile strip 10 includes a bottom web 16 with interlocking members 14, 15 that interlock with a first interlocking member 12 of first top web 20 and a second interlocking member 13 of second top web 22. Bonding material 17 located on opposing portions of the bottom web 16 and the first and second top webs 20, 22 activates into peel seals when heat is applied.

Figure 2:
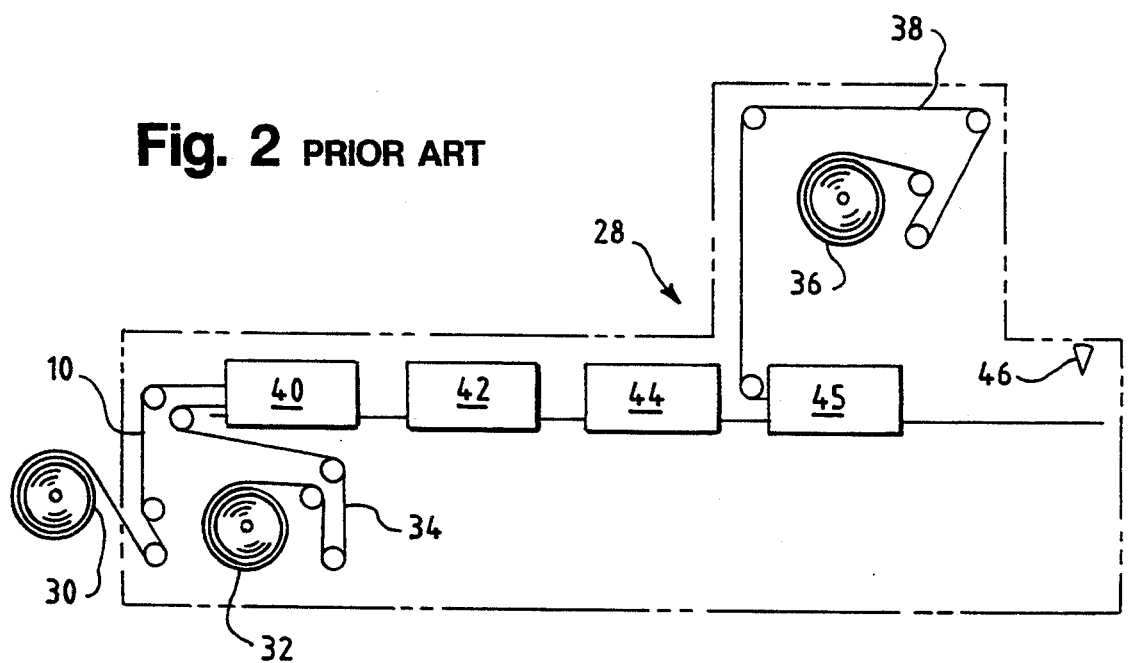
FIG. 2 is a schematic representation of a conventional horizontal form-fill-seal machine.

As shown in FIG. 2, continuous strips of double recloseable profile strip 10 are fed from a roll 30 into a conventional horizontal form-fill-seal machinery, generally designated by the reference numeral 28, to form recloseable packages. A roll 32 of bottom film 34 is fed into the machine 28 along with the recloseable profile strip 10. The area 40 represents the stage in the horizontal for-fill-seal machine 28 most pertinent to the present invention and is discussed in detail below. Cut sections of recloseable profile strip 10 exit area 40 bonded to bottom film 34. The recloseable profile strips 10 along with the bottom film 34 enter forming area 42 where the machine preheats and vacuum forms bottom film 34 into pairs of open cavities with the desired shape and on either side of the double recloseable profile strips 10. At a filling area 44, the machine fills the packages with the product. The machine then covers the filled cavities with a top film 38 from a roll 36 at a sealing area 45 and heat seals the top film 38 and the bottom film 34 together along a periphery of the cavity and also heat seals the top film 38 and the bottom film 34 to the recloseable profile strip 10, forming pairs of filled recloseable packages. At this point, the machine 28 may also activate any bonding materials to form peel seals. Finally, in a cutting area 46, the connected pairs of recloseable packages are cut into individual packages.

In area 40 the machine 28 creates loops in the bottom film 34. The machine 28 then heat seals the recloseable profile strip 10 to bottom film 34 and tack seals the recloseable profile strip 10. The machine 28 cuts the double recloseable profile strip 10 into sections that will correspond to pairs of recloseable packages. The machine 28 then straightens out the loops in the bottom film 34, forming gaps between the cut sections of recloseable profile strip 10.

Figure 3:
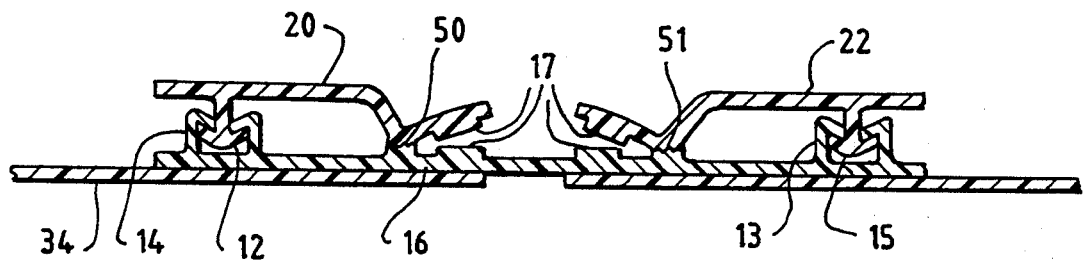
FIG. 3 is a cross-sectional view of a double recloseable profile strip of the prior art after being cut, bonded to the bottom film and tack sealed in a conventional horizontal form-fill-seal machine.

FIG. 3 illustrates a cross-sectional view of a section of a double recloseable profile strip 10 and bottom film 34 after exiting the area 40 of a conventional horizontal form-fill-seal machine 28. A heat seal 52 bonds bottom web 16 to bottom film 34. A tack seal 50 seals the top web 20 to the bottom web 16, and a tack seal 51 seals the top web 21 to the bottom web 16. The tack seals 50, 51 prevent the top webs 20, 22 of that section of recloseable profile strip 10 from slipping with respect to the bottom web 16, reducing the risk of a defective recloseable package. Tack seals, however, present several problems in the forming of recloseable packages. The tack seals 50, 51 can melt the interlocking members 12, 13 of the top webs 20, 22 and the interlocking members 14, 15 of the bottom web 16 together and hinder the opening of the recloseable package. Similarly, the tack seals 50, 51 may fall over bonding material 17 and activate a highly aggressive peel seal 17. In addition, the heated rods used to apply the tack seals 50, 51 to the recloseable profile strip 10 may sometimes puncture the top webs 20, 22, the bottom web 16 or the bottom film 34 with the result being product spoilage or contamination.

Figure 4:
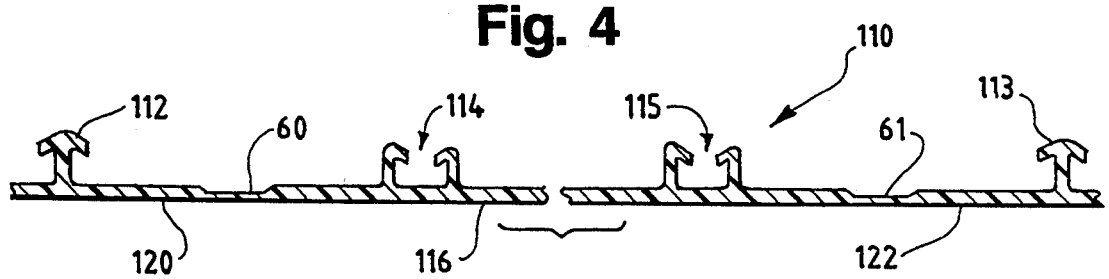
FIG. 4 is a cross-sectional view of the double recloseable profile strip of the present invention after first being extruded from a die.

The present invention eliminates the need for the tack seal when making recloseable packages. FIG. 4 illustrates the recloseable profile strip 110 immediately after being extruded through a die from a molten material. The recloseable profile strip 110 is extruded as a flat, single strip. A first top web 120 having a first interlocking member 112 and a second top web 122 having a second interlocking member 113 flank bottom web 116 having a first interlocking member 114 and a second interlocking member 115. A first joining web 60 joins the first top web 120 to the bottom web 116, and a second joining web 61 joins the second top web 122 to the bottom web 116. These joining webs 60, 61 are thin frangible webs that make tack seals unnecessary.

Figure 5:
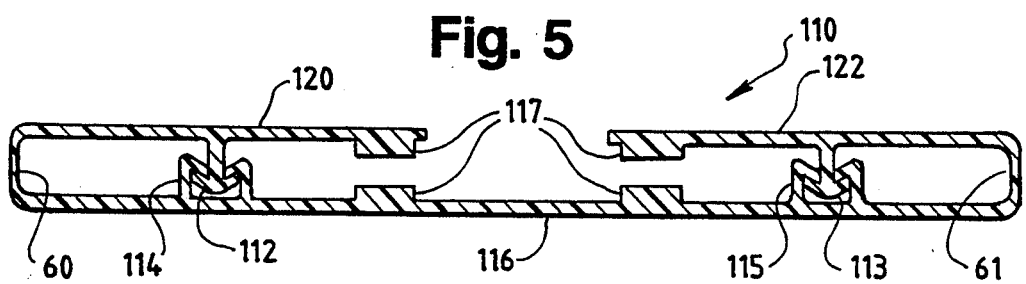
FIG. 5 is a cross-sectional representation of a double recloseable profile strip of the present invention.

After being extruded from the die, the recloseable profile strip 110 is cooled in a water bath. A machine then flips the first and second top webs 120, 122 and positions them above the bottom web 116. A mater interlocks the first interlocking member 112 of the first top web 120 with the first interlocking member 114 of the bottom web 116 and also interlocks the second interlocking member 113 of the second top web 122 with the second interlocking member 115 of the bottom web 116. A continuous recloseable profile strip results and is gathered into rolls. FIG. 5 illustrates a cross-sectional view of the double recloseable profile strip 110 as it would appear before being fed into a horizontal form-fill-seal machine. Bonding material 17 on opposing portions of the bottom web 116 and the first and second top webs 120, 122 may also be incorporated in the recloseable profile strip 110 to form peel seals.

Figure 6:
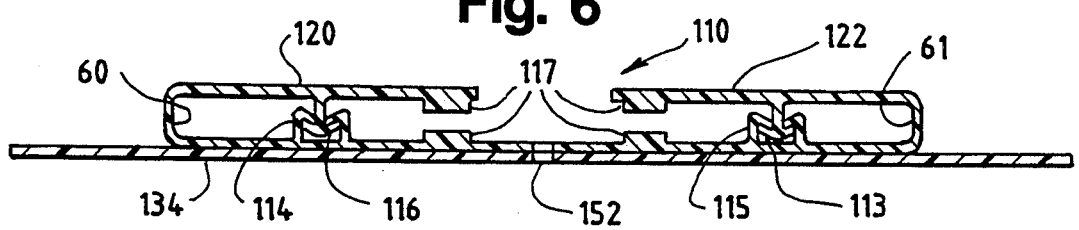
FIG. 6 is a cross-sectional view of a double recloseable profile strip of the present invention after being cut and bonded to the bottom film in a horizontal form-fill-seal machine.

FIG. 6 shows a double recloseable profile strip 110 of the present invention after exiting what corresponds to the first stage that was previously described in FIG. 2 as occurring within area 40. The recloseable profile strip 110 of the present invention undergoes the identical steps as in the prior art except the application of tack seals is omitted. After passing through the first stage of the horizontal form-fill-seal machine, a heat seal 152 has been applied joining the bottom web 116 to the bottom film 134 and recloseable profile strip 110 has been cut into sections. Each section of double recloseable profile strip 110 corresponds to a pair of recloseable packages. As with the prior art, the horizontal form-fill-seal machine then forms a cavity, fills the cavity, seals a top film over the filled cavity and cuts the joined recloseable packages into individual packages.

Figure 7:
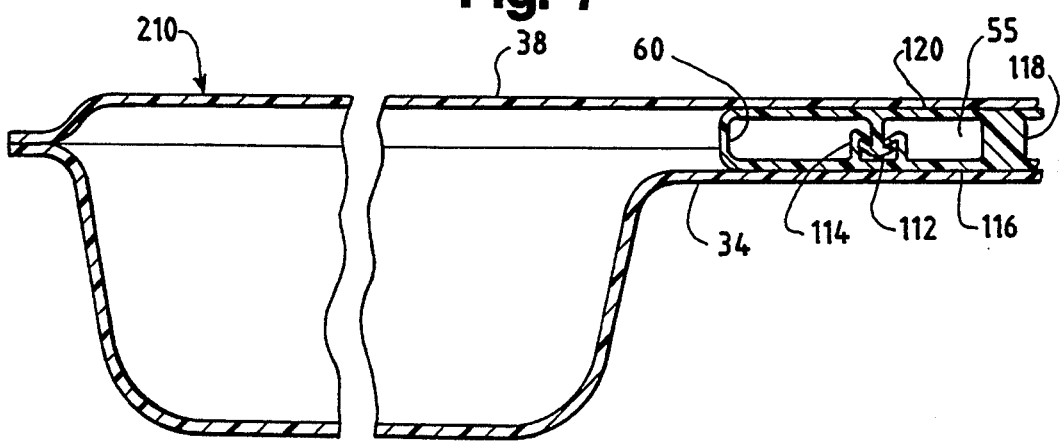
FIG. 7 is a cross-sectional representation of a recloseable package of the present invention.

FIG. 7 shows a cross-sectional view of an individual recloseable package of the present invention, generally designated by the reference numeral 210. The recloseable profile strip 55 of package 210 results from the cutting in half of the double recloseable profile strip 110 described in FIG. 5 by a horizontal form-fill-seal machine. The thin joining web 60 continues to join top web 120 to bottom web 116. A consumer unlocks the interlocking member 112 of the top web 120 from the interlocking member 114 of the bottom web 116 and rips through the thin joining web 60 to open the package formed by the top film 38 and the bottom film 34. If a peel seal 118 is present, the consumer will also have to unpeel the peel seal 118 in order to open the package. Afterwards, the consumer can reclose the package by interlocking the interlocking member 112 of the top web 120 with interlocking member 114 of the bottom web 116.

The present invention has been described as being used in the horizontal form-fill-seal method for forming recloseable packages. The present invention, however, may also be used with other methods of forming recloseable packages that will take advantage of the web slippage prevention, the stability, protection and convenience offered by the recloseable packages, the recloseable profile strip and the method of making a recloseable profile strip of the present invention.

Thus, the recloseable package, the recloseable profile strip and the method of the present invention and many of their attendant advantages will be understood from the foregoing description and various modifications may be made in the form and configuration of the parts and steps thereof without departing from the spirit and scope of the invention or sacrificing all of their material advantages, the form described above being merely a preferred or exemplary embodiment thereof.

We claim:

1. A reclosable package having a reclosable profile strip, said reclosable profile strip comprising:
    a top web having an interlocking member;
    a bottom web having an interlocking member that interlocks with said interlocking member of said top web;
    a joining web that joins said top web and said bottom web at a margin of said bottom web and a margin of said top web interior within said package with respect to said interlocking members, said joining web being substantially thinner than said top web and said bottom web; and
    a peel seal formed from bonding material on opposing portions of said top web and said bottom web, said peel seal being positioned exterior within said package with respect to said interlocking members, such that said interlocking members are hermetically isolated between said joining web and said peel seal.

2. The reclasable package of claim 1 wherein said top web, said bottom web, said bonding material and said joining web of said reclasable profile strip are coextruded as a one piece reclasable profile strip.

3. The reclasable package of claim 1 wherein the interlocking member of the bottom web and the interlocking member of the top web interlock as a mated pair of a male profile with a female profile.

4. A reclasable package comprising:
    a top film;

a bottom film, wherein said top film and said bottom film are sealed together along sides of said top film and said bottom film to form said package; and a reclosable profile strip sealed along one side of said package to said top film and said bottom film, wherein said reclosable profile strip includes:

a top web sealed to said top film and having an interlocking member;

a bottom web sealed to said bottom film and having an interlocking member that interlocks with said interlocking member of said top web;

a joining web that joins said top web and said bottom web at a margin of said bottom web and a margin of said top web interior within said package with respect to said interlocking members and said joining web being substantially thinner than said top web and said bottom web; and a peel seal formed from bonding material on opposing portions of said top web and said bottom web, said peel seal being positioned exterior within said package with respect to said interlocking members, such that said interlocking members are hermetically isolated between said joining web and said peel seal.

5. The reclosable package of claim 4 wherein said top web, said bottom web, said bonding material and said joining web of said reclosable profile strip are coextruded as a one piece reclosable profile strip.

6. The reclosable package of claim 4 wherein said interlocking member of said bottom web and said interlocking member of said top web of said reclosable profile strip interlock as a mated pair of a male profile with a female profile.

7. A reclosable package comprising:

a top film;

a bottom film, wherein said top film and said bottom film are sealed together along the sides of said top film and said bottom film to form a package; and a reclosable profile strip sealed along one side of said top film and said bottom film to form said reclosable package and wherein said reclosable profile strip includes;

a top web having an interlocking member wherein said interlocking member is a male profile;

a bottom web having an interlocking member that interlocks with said interlocking member of said top web wherein said interlocking member of said bottom web is a female profile and said interlocking members of said top web and said bottom web form a mated pair of interlocking men, hers of a male profile and a female profile;

a joining web that joins said top web with said bottom web at a margin of said bottom web and a margin of said top web interior within said package with respect to said interlocking members; and a peel seal formed from bonding material on opposing portions of said top web and said bottom web, said peel seal being positioned exterior within said package with respect to said interlocking members, such that said interlocking members are hermetically isolated between said joining web and said peel seal, and wherein said Joining web, said bottom web, said top web, and said bonding material are coextruded as a one piece reclosable profile strip and said joining web is substantially thinner than said top web and said bottom web.

8. A pair of reclosable packages having reclosable profile strips, said reclosable profile strips being formed from a reclosable profile strip comprising:

a first top web and a second top web, each of said top webs having an interlocking member;

a bottom web having a first interlocking member that interlocks with said interlocking member of said first top web to form a first pair of interlocking members and a second interlocking member that interlocks with said interlocking member of said second top web to form a second pair of interlocking members;

a first joining web that joins said first top web with said bottom web at a first margin of said bottom web and a margin of said first top web interior within the first of said pair of packages with respect to said first pair of interlocking members;

a second joining web that joins said second top web with said bottom web at a second margin of said bottom web and a margin of said second top web interior within the second of said pair of packages with respect to said second pair of interlocking members, said first and second Joining webs being substantially thinner than said top webs and said bottom web; and first and second peel seals formed from bonding material on opposing portions of said first and second webs and said bottom web, said first and second peel seals being positioned exterior within each of said pair of packages with respect to said first and second pairs of interlocking members respectively, such that said first pair of interlocking members is hermetically isolated between said first joining web and said first peel seal and said second pair of interlocking members is hermetically isolated between said second joining web and said second peel seal.

9. The pair of reclosable packages of claim 8 wherein said top webs, said bottom web, said bonding material and said joining webs of said reclosable profile strip are coextruded as a one piece reclosable profile strip.

10. The pair of reclosable packages of claim 8 wherein the first and second interlocking members of the bottom web and the interlocking members of said top webs interlock as two mated pairs of a male profile with a female profile.

11. A pair of reclosable packages having reclosable profile strips, said reclosable profile strips being formed from a reclosable profile strip comprising:

a first top web and a second top web, each of said webs having an interlocking member and wherein said interlocking members are male profiles;

a bottom web having a first interlocking member that interlocks with said interlocking member of said first top web to form a first pair of interlocking members and a second interlocking member that interlocks with said interlocking member of said second top web to form a second pair of interlocking members and wherein said first and second interlocking members of said bottom web are female profiles;

a first joining web that joins said first top web with said bottom web at a first margin of said bottom web and a margin of said first top web interior within the first of said pair of packages with respect to said first pair of interlocking members;

a second joining web that joins said second top web with said bottom web at a second margin of said bottom web and a margin of said second top web interior within the second of said pair of packages with respect to said second pair of interlocking members; and first and second peel seals formed from bonding material on opposing portions of said first and second top webs and said bottom web, said first and second peel seals being positioned exterior within each of said pair of packages with respect to said first and second pairs of interlocking members, such that said first pair of interlocking members is hermetically isolated between said first Joining web and said first peel seal and said second pair of interlocking members is hermetically isolated between said second joining web and said second peel seal, and wherein said first and second top webs, said bottom web, said first and second joining webs, and said bonding material of said reclosable profile are co-extruded as a one piece reclosable profile strip and said first and second Joining webs are substantially thinner than said first and second top webs and said bottom web.

* * * * *